(12) United States Patent
Crandall et al.

(10) Patent No.: US 7,643,693 B1
(45) Date of Patent: Jan. 5, 2010

(54) FAST LOSSLESS ENCODER FOR DIGITIZED ANALOG DATA

(75) Inventors: Richard E Crandall, Portland, OR (US); Evan T Jones, Portland, OR (US); Jason Klivington, Portland, OR (US); Mitchell Oslick, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 661 days.

(21) Appl. No.: 10/826,927

(22) Filed: Apr. 16, 2004

(51) Int. Cl.
*G06K 9/36* (2006.01)
*G06K 9/46* (2006.01)

(52) U.S. Cl. .................. 382/244; 382/166; 382/238

(58) Field of Classification Search .......... 382/166, 382/238, 244; 358/426.14; 704/500
See application file for complete search history.

(56) References Cited

U.S. PATENT DOCUMENTS

| | | | | |
|---|---|---|---|---|
| 5,764,374 | A * | 6/1998 | Seroussi et al. | 382/244 |
| 6,125,348 | A * | 9/2000 | Levine | 704/500 |
| 6,137,533 | A | 10/2000 | Azim | |
| 6,486,504 | B1 | 11/2002 | Guidash | |
| 6,549,235 | B1 | 4/2003 | Fossum et al. | |
| 6,711,295 | B2 * | 3/2004 | Nakayama et al. | 382/232 |

OTHER PUBLICATIONS

Crandall, R. E. and Klivington, J. 1999, Vector implementation of multiprecision arithmetic, Advanced Computation Group, Apple Computer (Oct. 25), pp. 1-15.

Crandall, R. E. 2000, PowerPC G4 for Engineering, Science, and Education, Advanced Computation Group, Apple Computer, pp. 1-12.

JJ2000, An Introduction to JJ2000 Software, Tutorials, pp. 1-12, http://jj2000.epfl.ch/jj_tutorials/jj2000/index.html, visited Aug. 21, 2003.

A. Kiely and M. Klimesh, "Generalized Golomb Codes and Adaptive Coding of Wavelet-Transformed Image Subbands" IPN Progress Report 42-154, Apr. 15, 2003, pp. 1-12.

Nasir Memom and Xiaolin Wu, "Recent Developments in Context-Based Predictive Techniques for Lossless Image Compression." The Computer Journal. vol. 40, No. 2/3 1997 pp. 127-136.

Giovanni Motta, et al "Lossless Image Coding via Adaptive Linear Prediction and Classification," Proceedings of the IEEE, vol. 88, No. 11, Nov. 2000, pp. 1790-1796.

(Continued)

*Primary Examiner*—Phuoc Tran
(74) *Attorney, Agent, or Firm*—Fenwick & West LLP (57) ABSTRACT

Lossless compression and the corresponding decompression of image and audio data are enabled using a combination of dynamic prediction and Golomb coding. First, data is converted from the RGB domain into the YUV domain. Next, a dynamic prediction algorithm is run to express pixel values as differential values rather than original bit values. Prediction coefficients are re-evaluated on the fly enabling additional compression because of more accurate predictors. An Adaptive Golomb Engine next performs an additional compression step, using an adaptive form of Golomb encoding in which mean values are variable across the data. The use of variable mean values reduces the deleterious effects found in conventional Golomb encoding in which localized regions of similar data are inefficiently coded if their bit values are uncommon in the data as a whole.

30 Claims, 4 Drawing Sheets

OTHER PUBLICATIONS

Shantanu D. Rane and Guillermo Sapiro "Evaluation of JPEG-LS, the New Lossless and Controlled-Lossy Still Image Compression Standard, for Compression of High-Resolution Elevation Data," IEEE Transactions of Geoscience and Remote Sensing, vol. 39, No. 10, Oct. 2001, pp. 2298-2306.

M. Weinberger, G. Seroussi, G. Sapiro, "The LOCO-I Lossless Image Compression Algorithm: Principles and Standardization into JPEG-LS", Hewlett-Packard Laboratories Technical Report No. HPL-98-193R1, Nov. 1998, revised Oct. 1999. *IEEE Trans. Image Processing*, vol. 9, Aug. 2000, pp. 1309-1324.

* cited by examiner

FAST LOSSLESS ENCODER FOR DIGITIZED ANALOG DATA

BACKGROUND OF THE INVENTION

1. Field of the Invention

The present invention relates generally to compressing and decompressing audio and image data. In particular, the present invention relates to a lossless encoder that uses a dynamic predictor and adaptive Golomb encoder to compress audio and image data.

2. Description of the Related Art

The proliferation of digital content has created an associated need for media on which to store that digital content. To provide full-screen real-time animations, storage that is by today's standards quite sizeable in quantity must be available. For example, a typical high-definition image resolution is 1920 pixels by 1080 pixels, for a total of just under two megapixels. If the display is updated at 24 frames per second, this means that approximately 50 megapixels must be displayed every second. At a movie quality color depth of 48 bits per pixel, this means that 2.2 gigabits must be displayed every second, and a 90-minute movie requires almost 12 terabits (1.5 terabytes) of storage. Clearly, then, a way to compress these bits to save storage space is desirable. Unfortunately, conventional compression algorithms such as JPEG tend to be lossy—that is, information is lost as a part of the compression algorithm, and the original data cannot be completely recovered from the compressed data. This is an undesirable outcome, especially for videophiles and audiophiles not willing to sacrifice quality by giving up image resolution or audio fidelity.

What is needed, therefore, is a system and method for efficiently compressing image and audio data in a lossless manner.

SUMMARY OF THE INVENTION

The present invention enables the lossless compression and corresponding decompression of image and audio data using a combination of dynamic prediction and Golomb coding. A dynamic prediction algorithm is run to express pixel values as differential values rather than original bit values. Predictor coefficients are re-evaluated on the fly using a nonlinear feedback method, enabling additional compression because of more accurate predictions. An Adaptive Golomb Engine of the present invention next performs an additional compression step, using an adaptive form of Golomb encoding in which mean values are variable across the data. The use of variable mean values reduces the deleterious effects found in conventional Golomb encoding in which localized regions of similar data are inefficiently coded if their bit values are uncommon in the data as a whole. In addition, image data is first converted by the present invention from the RGB domain into a YUV domain before being processed by the dynamic prediction algorithm.

Because the compression performed by the Dynamic Predictor and the Adaptive Golomb Engine are lossless, application of the inverse compression logic in reverse order, that is, decompression using the Adaptive Golomb engine, followed by restoration of the original audio data or YUV image data by the Dynamic Predictor, and in the case of image data, ultimately performing an inverse transform to convert YUV image data to the RGB domain yields an identical set of data to that which was initially compressed.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
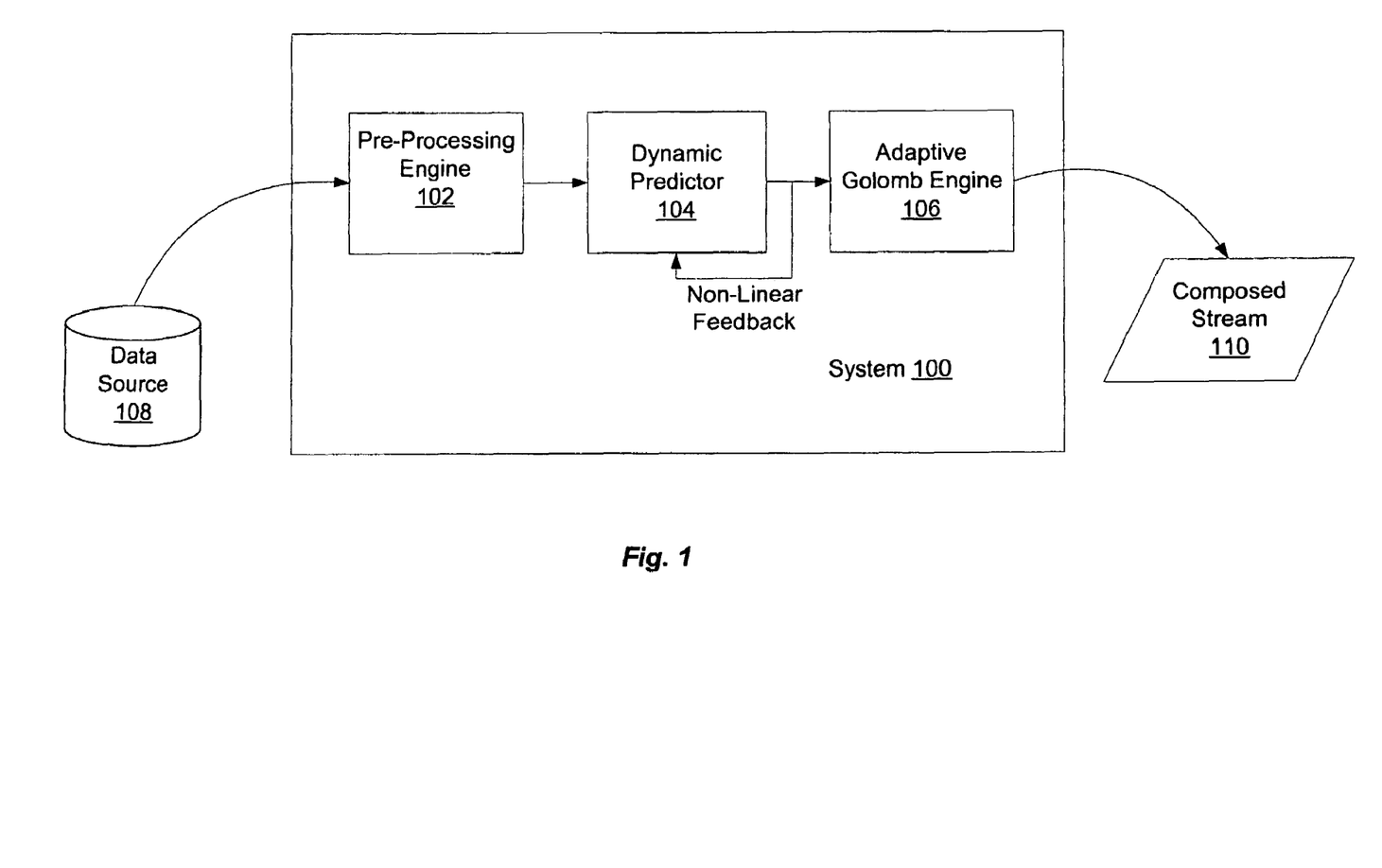
FIG. 1 is a block diagram illustrating a system in accordance with an embodiment of the present invention.

FIG. 1 illustrates a block diagram of a system in accordance with an embodiment of the present invention. FIG. 1 includes a Pre-Processing Engine 102, a Dynamic Predictor 104, and an Adaptive Golomb Engine 106. Also illustrated in FIG. 1 are a data source 108, and a composed stream 110.

Data source 108 stores uncompressed image or audio data. Those of skill in the art will appreciate that data source 108, although depicted as a single storage unit, may be one, two or many storage devices, as desired by the implementer. For example, where a full-length movie of several terabytes is to be compressed, it may exist in an uncompressed format across several different data sources.

Figure 2:
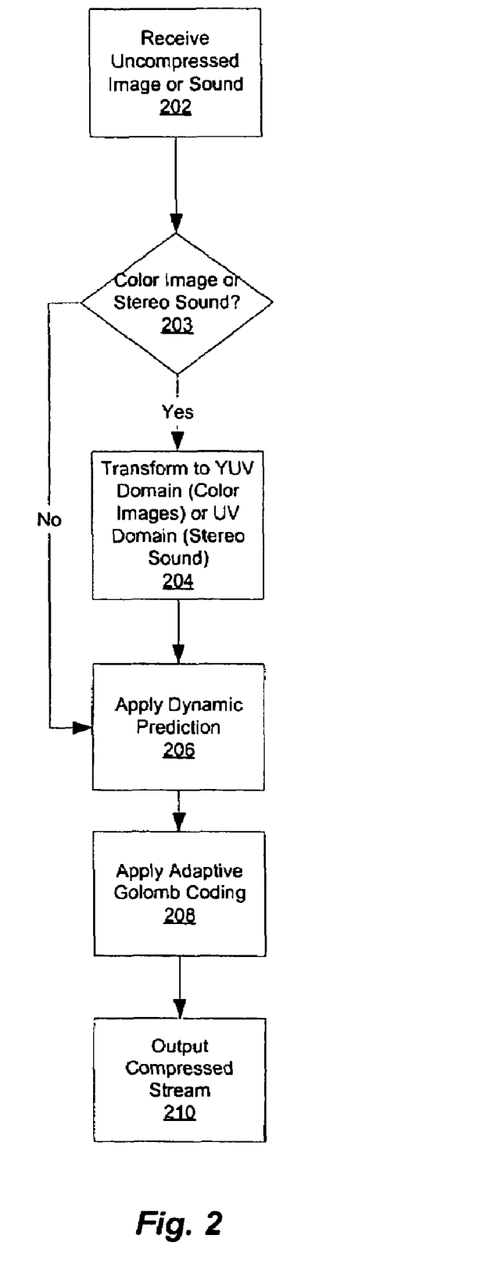
FIG. 2 is a flowchart illustrating a method for compressing a stream of data in accordance with an embodiment of the present invention.

Referring both to FIG. 1 and FIG. 2, the uncompressed data from data source 108 is transmitted to system 100 and received 202 by Pre-Processing Engine 102. If the data includes 203 color image or stereo sound data, Pre-Processing Engine 102 transforms 204 the data in a manner as described below. After the data has been transformed by Pre-Processing Engine 102, if applicable, or else after it is received 202, it is passed to Dynamic Predictor 104. Dynamic Predictor 104 performs 206 a lossless encoding of the data as described below with respect to FIG. 3, and passes the compressed data to Adaptive Golomb Engine 106. Adaptive Golomb Engine 106 performs 208 still another level of compression, as described below with respect to FIG. 4, and outputs 210 a compressed stream of data. Composed stream 110 can then be output to a storage device, transmitted to a remote location, etc.

Pre-Processing Engine

As noted above, image and audio data sought to be compressed is first pre-processed by Pre-Processing Engine 102. In the case of image data, in a preferred embodiment, each pixel in the uncompressed image data includes values for three color channels—red (R), green (G) and blue (B). Pre-Processing Engine 102 preferably algebraically transforms the values for each pixel from the RGB domain into a YUV domain. This is a lossless transform that removes redundancy between channels. Although the Y channel may have higher entropy (average pixel values) than the original channels, the U and V channels preferably have smaller entropy, thus encoding more easily. In one embodiment the transform is of the following form:

$$Y = \text{floor}\left(\frac{R+2G+B}{4}\right)$$

$$U=B-G$$

$$V=R-G$$

As will be appreciated by those of skill in the art, the above transformations are completely invertible, resulting in no lost data. In the YUV domain, Y represents intensity, or "luminance," while U and V represent chrominance values. Transforming RGB data into YUV data allows for better compression, since most of the image data is moved into a single channel—in this case the Y channel. Those of skill in the art will appreciate that there are other transformations for YUV that enjoy lossless invertability.

Similarly, for an audio stream having a left (L) and right (R) channel, $$U = \text{floor}\left(\frac{L+R}{2}\right)$$

$$V=L-R$$

Here, since the L and R channels are expected to be somewhat similar, V will be a fairly small number, which improves the overall compression operation.

Those of skill in the art will appreciate that other transforms can also be used. For example, in an alternative embodiment, $$U = \text{floor}\left(\frac{7L+R}{8}\right)$$

$$V=L-R$$

which is also an invertible lossless transformation. In general, in the audio case, transforms of the form $$U = \text{floor}\left(\frac{aL+(b-a)R}{b}\right)$$

$$V=L-R$$

often prove useful.

Once transformed by Pre-Processing Engine 102, the data stream is then passed to Dynamic Predictor 104.

Dynamic Predictor

In a preferred embodiment, DP 104 creates an approximately Laplacian statistic $$\left(\frac{1}{2\lambda}\right)\cdot\exp(-|\Delta|/\lambda),$$

via nonlinear feedback on a predictor function P, for presentation to the Adaptive Golomb Engine 106. DP 104 proceeds as follows.

DP 104 can dynamically modify the predictor function P deterministically, according to local statistics of the previous $\Delta_n$. Conventional methods of prediction use, for example, optimized coefficients in the P algebra. But such methods typically involve storage of optimal coefficients in the compression stream. Instead, DP 104 allows the predictor function characteristics to percolate deterministically, on the basis only of known initial conditions. To later decompress the data, DP 104 can again precisely mimic this percolation.

Let the input data be denoted $x=(x_0, x_1, \ldots)$ where each $x_i$ is an integer. For example, for 16-bit monaural sound, one may have $x_i \in [-2^{15}, 2^{15}-1]$, whereas for images one may have a luminance channel y with $y_i \in [0, 255]$. Then one considers an integer-valued predictor function $$P_n=P(x_{n-1},x_{n-2},\ldots,x_{n-M})$$

where M is a fixed "order," which is used as a guess on the next datum $x_n$. One forms the difference $$\Delta_n=x_n-P_n,$$

and sends the transformed data ($\Delta_n$) to an entropy encoder. Those of skill in the art will recognize that for an order-1 predictor $P:=x_{n-1}$ this simply requires compressing the first differences $\Delta_n=x_n-x_{n-1}$. Preferably, the general datum $\Delta_n$ is "small," in this way attempting compression. Losslessness is guaranteed because the coefficient of $x_n$ is unity. That is, values for the first M data $x_0, \ldots, x_{M-1}$ are stored, along with the ensuing $\Delta_n$ for $n \geq M$. Decompression uses the recovered $\Delta_n$ to causally and losslessly construct $$x_n=\Delta_n+P_n(x_{n-1},\ldots,x_{n-M}).$$

Consider an analog input of at least slightly-correlated noise, according to the model recursion $$x_n=rx_{n-1}+\epsilon_{n-1},$$

where r is a correlation constant, $\epsilon_n$ is an independent and identically distributed (i.i.d.) noise signal of variance $\epsilon^2$ and zero mean (e.g. a Gaussian variable uncorrelated to anything else except itself), and normalized so that $<x_n^2>=1=r^2+\epsilon^2$. Note that for $r=1$, $\epsilon=0$ and the data $x_n$ are all the same constant, while for $r=0$, uncorrelated noise $x_n=\epsilon_n$ of unit variance. Note also that $<x_n x_{n-1}>=r$, so that r is indeed a measure of inter-data correlation. The first-difference predictor $P_n=x_{n-1}$ has variance $$<\Delta_n^2>=<(x_n-x_{n-1})^2>=1+1-2<x_n x_{n-1}>=2-2r,$$

and $2-2r$ may or may not be less than the direct variance $<x_n^2>=1$.

This leads to the conclusion that for the correlated-noise model $x_n=rx_{n-1}+\epsilon_{n-1}$, encoding of first-difference data $\Delta_n=x_n-x_{n-1}$ is more efficient than direct encoding of the $x_n$ if and only if $r>\frac{1}{2}$.

A general form for order-M predictors is as follows:

$$P_n = a_1 x_{n-1} + a_2 x_{n-2} + \cdots a_M x_{n-M} = \sum_{i=1}^{M} a_i x_{n-1},$$

where $$\sum_{i=1}^{M} a_i = 1.$$

This normalization condition ensures that a constant input $x_n = c$ yields a zero difference $\Delta_n = x_n - P_n$. Next, we find a coefficient a such that the 2nd-order predictor function (M=2)

$$P_n = a x_{n-1} + (1-a) x_{n-2}$$

results in minimum variance of the difference $$\Delta_n = x_n - P_n.$$

We proceed from $$\Delta_n = x_n - a x_{n-1} - (1-a) x_{n-2}$$

to calculate $$\langle \Delta_n^2 \rangle = 1 + a^2 + (1-a)^2 - 2ar - 2(1-a)r^2 + 2a(1-a)r.$$

This quadratic form is minimized for $a=(1+r)/2$, whence $$\langle \Delta^2 \rangle_{min} = \frac{1}{2}(1 - r^2)(3 - r).$$

Thus, the best (minimal variance) M=2 predictor for the noise model has $$\Delta_n = x_n - \frac{1+r}{2} x_{n-1} - \frac{1-r}{2} x_{n-2},$$

and this variance performs better than a direct-encoding variance 1 when r exceeds about 0.4608. If the correlation r is not known ahead of time, or if r changes effectively with index n (time or space), then such calculations lose meaning.

As noted above, DP 104 involves the use of dynamically modified coefficients. If the coefficients are made index-dependent, that is we allow $a_i \to a_{i,n}$, the difference signal is $$\Delta_n = x_n - \sum_{i=1}^{M} a_{i,n} x_{n-1},$$

and $a_{i,n}$ can be modified according to previous $\Delta$ values. Let us also force $$a_{M,n} = 1 - \sum_{i=1}^{M-1} a_{i,n},$$

so that the normalization is guaranteed with just M−1 coefficients. In one embodiment, a nonlinear-feedback formula amounts to a prescription for incrementing/decrementing coefficient values by $$a_{i,n+1} += \delta \cdot sign(\Delta_n) \cdot sign(x_{n-i} - x_n),$$

where $\delta$ is a (typically small) positive number, and sign(z): =1,0,−1 as z is positive, zero, negative, respectively. This adjustment of coefficients is a nonlinear process, and furthermore depends on past data. Using the sign of the previous $\Delta$ and the overall multiple of a given $a_{i,n}$, $\Delta_n$ is generally forced toward zero.

In one embodiment in order to improve speed performance, shift-rational arithmetic can be used by assuming $\delta=1$ and $$\Delta_n = x_n - \left( \left( \sum_{i=1}^{M} a_{i,n} x_{n-1} \right) >> s \right),$$

which implies $\delta \approx \frac{1}{2}^s$. High speed can be achieved with the pure-integer arithmetic involved, and additionally, the integer coefficients $a_{i,n}$ are merely incremented/decremented by 1 (or unchanged).

Figure 3:
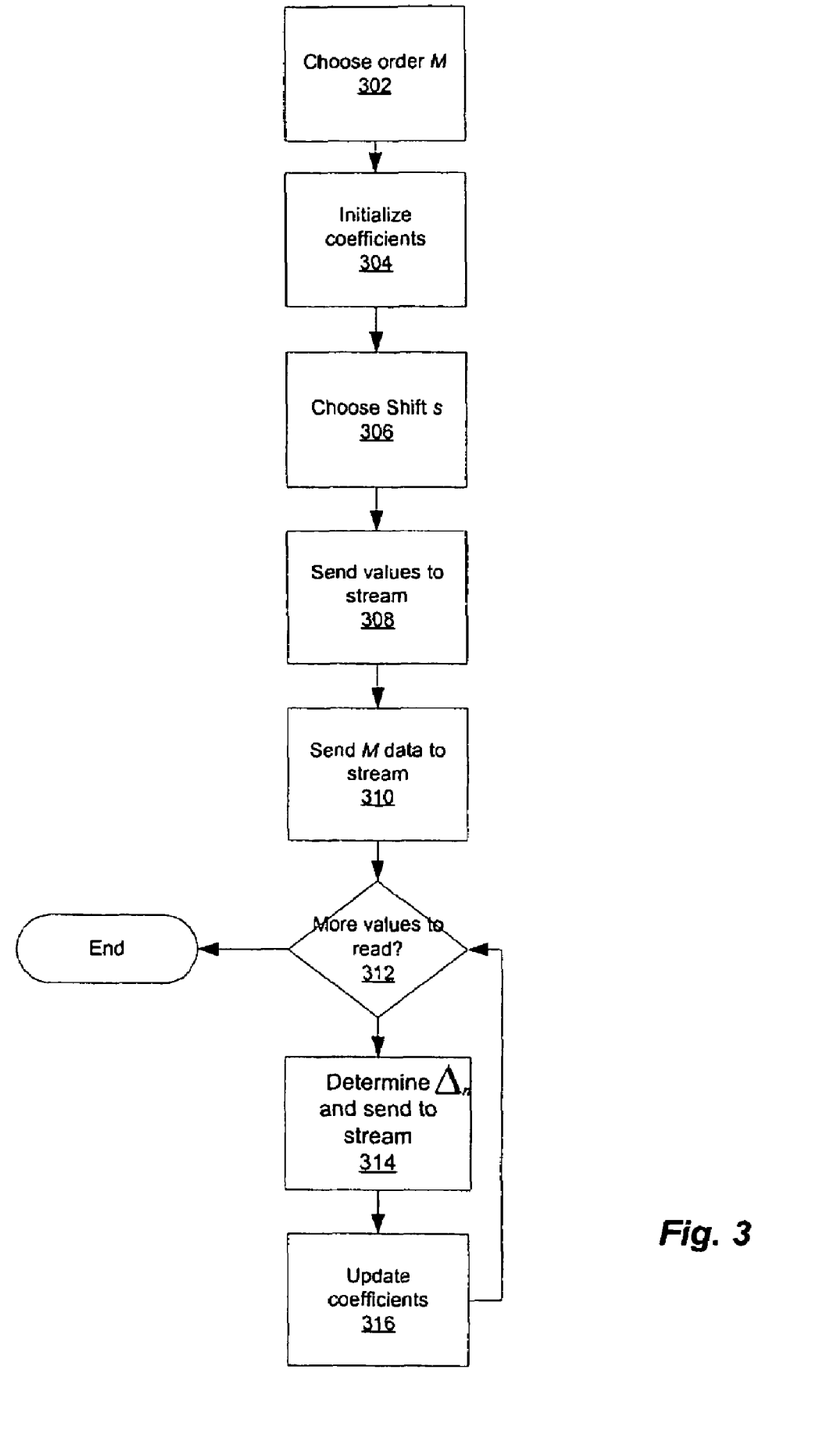
FIG. 3 is a flowchart illustrating the operation of a Dynamic Predictor in accordance with an embodiment of the present invention.

Referring now to FIG. 3, there is shown a flowchart illustrating an algorithm for providing non-linear feedback to the Dynamic Predictor 104. First, DP 104 chooses 302 an order M. Order M is preferably chosen by the implementer, and can vary according to experimental results. In one embodiment, the order is 16. Once the order has been chosen 302, the coefficients ($a_{1,M}, a_{2,M}, \ldots, a_{M-1,M}$) are initialized 304. Note also that $a_{M,M}$ is 1 minus the sum of the remaining coefficients. Next, DP 104 chooses 306 a shift amount s as described above. The order, shift and initial coefficients are then sent 308 to the output stream, as well as the data ($x_0, \ldots, x_{M-1}$) itself 310. Note that the data may be uncompressed data, or may already have been partially compressed by another algorithm, so long as it was a lossless algorithm.

Finally, if 312 there are more data to be read, (that is, $n \geq M$), $\Delta_n$ is determined for each n, and sent 314 to the output stream. The coefficients are then updated 316 such that $a_{i,n+1}$ is updated for each i $\in [1, M-1]$, with $\delta = 1$.

Note that DP 104 preferably uses a 2-dimensional generalization of the predictor equation presented earlier when processing images; namely, for pixel values ($x_{m,n}$) at coordinates (m, n) we compute a difference $$\Delta_{m,n} = x_{m,n} - \sum_{i,j} A_{i,j} x_{m-i,n-j},$$

where now we allow any lexicographically causal sum. For example, index pairs (i,j)=(0,−1), (−1,0), (−1,−1) can all have nonvanishing $A_{i,j}$ in the classical sense of propagating the predictor algebra lexicographically. The feedback calculus of DP 104 is similarly generalized, so that the $A_{i,j}$ are modified dynamically as one scans an image.

Adaptive Golomb Engine

The compressed image stream output from Dynamic Predictor 104 is then provided as input to Adaptive Golomb Engine 106. A Golomb encoder is an efficient way to represent data having a Laplacian distribution, such as the data output from Dynamic Predictor 104. Data encoded using a Golomb encoder typically has a format including both unary and binary components.

As is known in the art, Golomb coding involves representing the most frequently-occurring values using tokens having a small number of bits. This results in a form of compression, since the tokens generally will have fewer bits than the pixel values they replace. However, there can exist areas of an image in which there are a series of values having a magnitude very different from the most frequently-occurring values, and yet which repeat often within the local region. For example, if the pixel value "230" is not common overall in the image data, it will likely not be a value selected for large savings using a small token. However, it may be the case that there is a region of the image with many values of or near "230", even though the region is not large compared with the rest of the image. A conventional Golomb coding scheme sacrifices the extra bits used to repeat these values in order to achieve an overall satisfactory compression level. That is, if a token of fewer bits were used to express "230", more bits would be required for a different token, and the overall compression rate would decrease.

System 100 improves upon this conventional method using Adaptive Golomb Engine 106 in coordination with Dynamic Predictor 104. Adaptive Golomb Engine (AG) 106 determines how many bits to use for a token based on a region more localized than the overall image. AG 106 determines a mean, which is preferably a weighted average of the most recent values encountered by the AG 106. For example, in one embodiment the previous ten values are considered. Because the mean is a moving average, if recent values have been close to, say, "230", then the mean will trend toward "230". On the other hand, if recent values have been closer to another value, e.g., "3", then the mean will trend toward "3". Because the mean is not fixed for an entire set of data, AG 106 therefore is able to achieve an optimal level of compression on a more local level than is achieved using non-adaptive Golomb coding.

Figure 4:
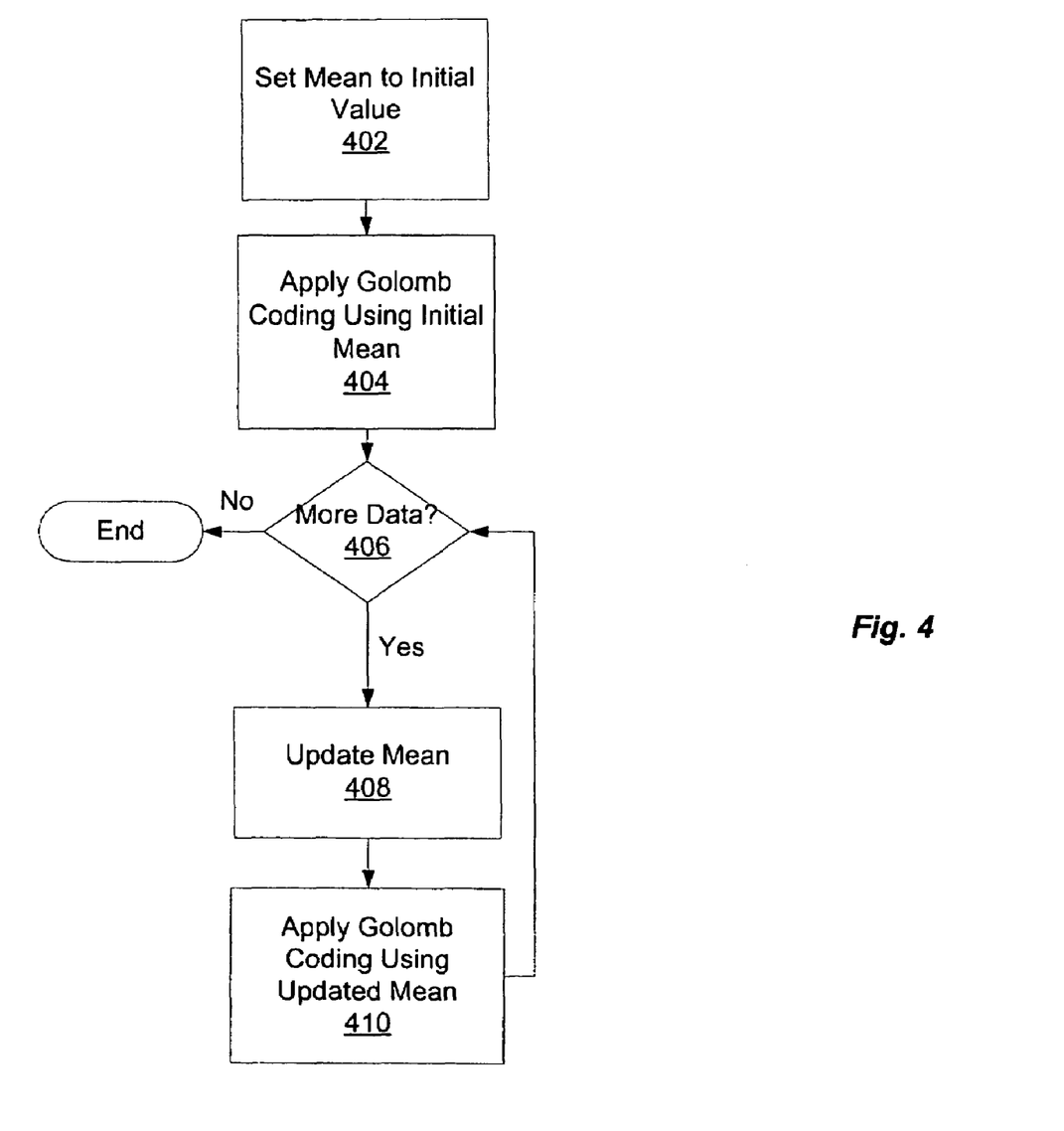
FIG. 4 is a flowchart illustrating a method carried out by an Adaptive Golomb Engine in accordance with an embodiment of the present invention.

FIG. 4 illustrates a flow chart of the operation of Adaptive Golomb Engine 106. First, AG 106 sets (402) its mean to an initial value, which is preferably derived empirically. For example, in one embodiment the mean is 3. Next, AG 106 applies (404) the Golomb coding as described above to a pixel to be encoded. If (406) more pixels remain, then the mean is updated (408) to reflect a moving average of the most recent pixels, and the next pixel is encoded (410) using the updated mean. Once no more data (406) remains, the AG process terminates and outputs the stream of compressed data.

The compression performed by the Dynamic Predictor and the Adaptive Golomb Engine are lossless. Therefore, application of the inverse compression logic in reverse order, and, for image data, performing an inverse transform to convert YUV data back into the RGB domain yields an identical set of data to that which was initially compressed. Composed stream 110 is input into the Adaptive Golomb Engine 106 to be decompressed according to a decompression algorithm.

Figure 5:
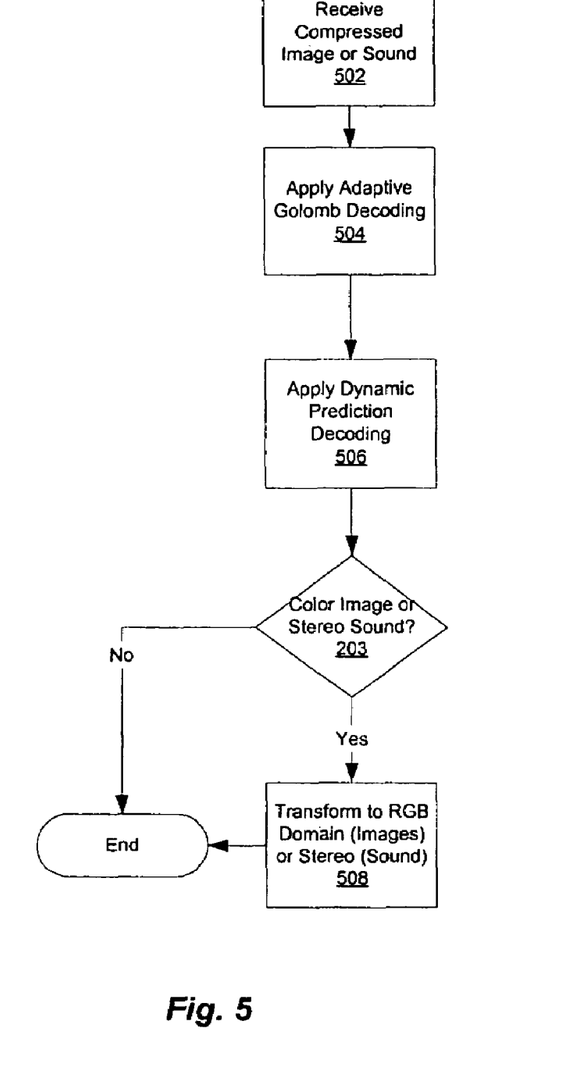
FIG. 5 is a flowchart illustrating a method for decompressing a stream of data in accordance with an embodiment of the present invention.

Referring now to FIG. 5, when AG 106 receives 502 a stream 110 to be decoded, it applies 504 an Adaptive Golomb decoding algorithm by using the initial mean to decipher the first encoded entry. From the mean and the deciphered first entry, AG 106 can then proceed to calculate a new mean and decode the next entry. In such a manner, the stream is decoded to be identical to the data before it was originally compressed by AG 106.

When DP 104 receives a stream from AG 106 to be decompressed, it decodes 506 the compressed data by traversing each channel of the image, reconstructing original values from the stored differences and updating the coefficients exactly as they were updated during encoding.

Finally, once DP 104 has finished decoding the stream, if 507 it is color image or stereo sound data it is now in the YUV domain as transformed by the Pre-Processing Engine 102. By applying the reverse transformation to each pixel or audio bit value, the value is transformed 508 from the YUV domain back into the original domain, yielding the original uncompressed image or audio data. Alternatively, if the data is not color image or stereo sound data, it need not be transformed as it is already now uncompressed.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. For example, the particular functions of the Dynamic Predictor 104, Adaptive Golomb Engine 106, and so forth may be provided in many or one module.

Some portions of the above description present the feature of the present invention in terms of algorithms and symbolic representations of operations on information. These algorithmic descriptions and representations are the means used by those skilled in the audio and graphics compression arts to most effectively convey the substance of their work to others skilled in the art. These operations, while described functionally or logically, are understood to be implemented by computer programs or hardware. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for compressing a stream of image or audio data, the data stream received from a data source, the method executed by a processor and comprising:
    applying a dynamic prediction function to the stream of image or audio data received from the data source by using dynamically predicted coefficient values associated with the data according to non-linear feedback to yield a first compressed stream of image or audio data;
    applying a Golomb coding function to the first compressed stream of data to yield a second compressed stream of image or audio data; and
    outputting the second compressed stream of data to a computer-readable storage medium.

2. The method of claim 1 wherein the data is image data.

3. The method of claim 1 wherein the data is audio data.

4. The method of claim 1 further comprising transforming the data from a first domain to a second domain prior to applying the dynamic prediction function.

5. The method of claim 4 wherein the first domain is an RGB domain and the second domain is a YUV domain.

6. The method of claim 4 wherein the first domain is a left and right channel domain and the second domain is a UV domain.

7. The method of claim 1 wherein the first compressed stream of data has a Laplacian distribution.

8. The method of claim 1, wherein the dynamic prediction function yielding the first compressed stream of data is of the form $$\Delta_n = x_n - \sum_{i=1}^{M} a_{i,n} x_{n-1},$$

where $\Delta_n$ is the first compressed stream of data of the data $x_n$, M is a predetermined order, and $a_{i,n}$ is a dynamically predicted coefficient value associated with the data $x_n$.

9. The method of claim 8, wherein the dynamic prediction function modifying the dynamically predicted coefficient value associated with the data according to a non-linear feedback is of the form $$a_{i,n+1} +== \delta \cdot sign(\Delta_n) \cdot sign(x_{n-1} - x_n),$$

where $\delta$ is a positive number, and $sign(z) := 1, 0, -1$ as z is positive, zero, and negative, respectively.

10. The method of claim 1, wherein yielding the first compressed stream of data further comprises yielding the first compressed stream of data with improved speed performance according to the formula $$\Delta_n = x_n - \left( \left( \sum_{i=1}^{M} a_{i,n} x_{n-1} \right) >> s \right),$$

where >> is a shift-rational arithmetic function and s is an integer.

11. A computer program product for compressing a stream of image or audio data, the computer program product stored on a computer-readable medium containing executable instructions configured to cause a computer to perform the steps of:
    applying a dynamic prediction function to the stream of image or audio data received from a data source by using dynamically predicted coefficient values associated with the data according to a non-linear feedback to yield a first compressed stream of image or audio data;
    applying a Golomb coding function to the first compressed stream of data to yield a second compressed stream of image or audio data; and
    outputting the second compressed stream of data to a computer-readable storage medium.

12. The computer program product of claim 11 wherein the data is image data.

13. The computer program product of claim 11 wherein the data is audio data.

14. The computer program product of claim 11 further comprising instructions configured to cause a computer to transform the data from a first domain to a second domain prior to applying the dynamic prediction function.

15. The computer program product of claim 14 wherein the first domain is an RGB domain and the second domain is a YUV domain.

16. The computer program product of claim 14 wherein the first domain is a left and right channel domain and the second domain is a UV domain.

17. The computer program product of claim 11 wherein the first compressed stream of data has a Laplacian distribution.

18. The computer program product of claim 11, wherein the dynamic prediction function to yield the first compressed stream of data is of the form $$\Delta_n = x_n - \sum_{i=1}^{M} a_{i,n} x_{n-1},$$

where $\Delta_n$ is the first compressed stream of data of the data $x_n$, M is a predetermined order, and $a_{i,n}$ is a dynamically predicted coefficient value associated with the data $x_n$.

19. The computer program product of claim 18, wherein the instructions for applying a dynamic prediction function configured to modify the dynamically predicted coefficient value associated with the data according to a non-linear feedback of the form $$a_{i,n+1} += \delta \cdot sign(\Delta_n) \cdot sign(x_{n-1} - x_n),$$

where $\delta$ is a positive number, and $sign(z) := 1, 0, -1$ as z is positive, zero, and negative, respectively.

20. The computer program product of claim 11, wherein the instructions for applying a dynamic prediction function further configured to yield the first compressed stream of data with improved speed performance according to the formula $$\Delta_n = x_n - \left(\left(\sum_{i=1}^{M} a_{i,n} x_{n-1}\right) >> s\right),$$

where >> is a shift-rational arithmetic function and s is an integer.

21. A system for compressing a stream of image or audio data using a computer, the computer having a processor, the system comprising:
   a dynamic predictor module for compressing a stream of image or audio data received from a data source using dynamically predicted coefficient values associated with the data according to a non-linear feedback to produce a first compressed stream of image or audio data having a Laplacian distribution;
   an adaptive Golomb engine, communicatively coupled to the dynamic predictor module, adapted to receive the first compressed stream of data and to further compress the first compressed stream of data to form a second compressed stream of image or audio data; and
   a stream output device coupled to the adaptive Golomb engine, adapted to output the second compressed stream of data to a computer-readable storage medium.

22. The system of claim 21 wherein the data is image data.

23. The system of claim 21 wherein the data is audio data.

24. The method of claim 23 wherein the first domain is a left and right channel domain and the second domain is a UV domain.

25. The system of claim 21 further comprising a pre-processing engine for transforming the data from a first domain to a second domain prior to applying the dynamic prediction function.

26. The system of claim 25 wherein the first domain is an RGB domain and the second domain is a YUV domain.

27. The system of claim 21, wherein the dynamic predictor yields the first compressed stream of data according to the formula $$\Delta_n = x_n - \sum_{i=1}^{M} a_{i,n} x_{n-1},$$

where $\Delta_n$ is the first compressed stream of data of the data $x_n$, M is a predetermined order, and $a_{i,n}$ is a dynamically predicted coefficient value associated with the data $x_n$.

28. The system of claim 27, wherein the dynamic predictor modifies the dynamically predicted coefficient value associated with the data according to a non-linear feedback of the form $$a_{i,n+1} += \delta \cdot sign(\Delta_n) \cdot sign(x_{n-1} - x_n),$$

where $\delta$ is a positive number, and $sign(z) := 1, 0, -1$ as z is positive, zero, and negative, respectively.

29. The system of claim 21, wherein the dynamic predictor yields the first compressed stream of data with improved speed performance according to the formula $$\Delta_n = x_n - \left(\left(\sum_{i=1}^{M} a_{i,n} x_{n-1}\right) >> s\right),$$

where >> is a shift-rational arithmetic function and s is an integer.

30. A data compression system for compressing a stream of image or audio data, the system comprising:
   receiving means for receiving image or audio data to be compressed;
   dynamic predicting means, coupled to the receiving means, for applying a dynamic prediction function to the stream of image or audio data by using dynamically predicted coefficient values associated with the data according to a non-linear feedback to yield a first compressed stream of image or audio data;
   Golomb coding means, communicatively coupled to the dynamic predicting means, for applying a Golomb coding function to the first compressed stream of data to yield a second compressed stream of image or audio data; and
   outputting means, communicatively coupled to the Golomb coding means, for outputting the second compressed stream of data to a computer-readable storage medium.

* * * * *

UNITED STATES PATENT AND TRADEMARK OFFICE
CERTIFICATE OF CORRECTION

PATENT NO. : 7,643,693 B1  Page 1 of 1
APPLICATION NO. : 10/826927
DATED : January 5, 2010
INVENTOR(S) : Crandall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1214 days.

Signed and Sealed this

Sixteenth Day of November, 2010

David J. Kappos
*Director of the United States Patent and Trademark Office*